US012433919B2

(12) United States Patent
Breeding

(10) Patent No.: US 12,433,919 B2
(45) Date of Patent: *Oct. 7, 2025

(54) USE OF HEMOLYMPH OR HEMOLYMPH COMPONENTS TO REGENERATE, REPAIR AND RESTORE THE SKIN BARRIER

(71) Applicant: Marin Brands Inc., South Portland, ME (US)

(72) Inventor: William Patrick Breeding, South Portland, ME (US)

(73) Assignee: Marin Brands Inc., South Portland, ME (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/466,139

(22) Filed: Sep. 3, 2021

(65) Prior Publication Data

US 2022/0062351 A1    Mar. 3, 2022

Related U.S. Application Data

(60) Provisional application No. 63/074,089, filed on Sep. 3, 2020.

(51) Int. Cl.
| | | |
|---|---|---|
| *A61K 35/612* | (2015.01) | |
| *A61K 8/98* | (2006.01) | |
| *A61K 38/00* | (2006.01) | |
| *A61Q 19/00* | (2006.01) | |
| *A61Q 19/08* | (2006.01) | |
| *C07K 14/435* | (2006.01) | |

(52) U.S. Cl.
CPC ............ *A61K 35/612* (2013.01); *A61K 8/987* (2013.01); *A61Q 19/007* (2013.01); *A61Q 19/08* (2013.01); *C07K 14/43509* (2013.01); *A61K 38/00* (2013.01)

(58) Field of Classification Search
CPC ................ A61K 35/612; A61Q 19/007; C07K 14/43509
See application file for complete search history.

(56) References Cited

U.S. PATENT DOCUMENTS

| | | | |
|---|---|---|---|
| 8,436,141 B2 | 5/2013 | Becker | |
| 9,078,906 B2 | 7/2015 | Bayer | |
| 2011/0033499 A1 | 2/2011 | Cuthbertson | |
| 2017/0042946 A1* | 2/2017 | Bayer | ............. A61K 9/00 |
| 2021/0177913 A1* | 6/2021 | Breeding | ............. A61K 35/612 |

FOREIGN PATENT DOCUMENTS

| | | | | |
|---|---|---|---|---|
| FR | 2641463 A1 * | 3/1991 | | |
| FR | 2741266 A1 | 5/1997 | | |
| FR | 2804320 A1 * | 8/2001 | ............. | A61K 8/0212 |
| WO | WO-2005108576 A1 * | 11/2005 | ......... | C07K 14/43509 |

OTHER PUBLICATIONS

FR-2804320-A1 translated doc (Year: 2001).*
FR2641463A1 translated doc (Year: 1991).*
Guo, D., et al. "Functional properties of hemocyanin from Oncomelania hupensis, the intermediate host of Schistosoma japonicum," Experimental Parasitology vol. 123, Issue 3, Nov. 2009, pp. 277-281.
Dakieva, K., et al. "Purification of Hemocyanin from Marine Gastropod Rapana Thomasiana using Ammonium Sulfate Precipitation Method," Biotechnology & Biotechnological Equipment (2009), 23:3, pp. 1364-1367.
Keller, H., et al. "Abalone (Haliotis tuberculata) hemocyanin type 1 (HtH1)," Eur. J. Biochem. (1999) 264: pp. 27-38.
Molon, et al. "Molecular heterogeneity of the hemocyanin isolated from the king crab Paralithodes camtschaticae," Eur. J. Biochem. (2000) 267: pp. 7046-7057.
Pan, J.Y., et al. "Dodecamer is Required for Agglutination of Litopenaeus vannamei Hemocyanin with Bacterial Cells and Red Blood Cells," Marine Biotechnology (2008) 10(6), pp. 645-652.
Zanjani, et al. "Formulation of abalone hemocyanin with high antiviral activity and stability," European Journal of Pharmaceutical Sciences (2014) 53(1), pp. 77-85.
Mintel, "Energising Under Eye Cream" XP093200942, Database accession No. 1644605 [online] (Oct. 24, 2011) http://www.gnpd.com.

* cited by examiner

*Primary Examiner* — Terry A McKelvey
*Assistant Examiner* — Jacob A Boeckelman
(74) *Attorney, Agent, or Firm* — Amin Wasserman Gurnani LLP; George M. Carrera, Jr.; José J. Aparicio

(57) ABSTRACT

Uses are described for hemolymph, contents of hemolymph, fragments or components of the contents found within hemolymph, including hemocyanin, any of which may be derived from crustaceans, or recombinantly produced, as functional agents to treat diseases, provide symptomatic relief, provide a beautifying or relieving effect to the intended organ or site-of-intended-use, or be used as an ingredient in formulations designed to help regenerate, repair, or restore the function of the skin barrier, for applications falling within skin barrier restoration, wound healing and anti-aging effects.

23 Claims, No Drawings

USE OF HEMOLYMPH OR HEMOLYMPH COMPONENTS TO REGENERATE, REPAIR AND RESTORE THE SKIN BARRIER

This application claims the benefit of U.S. Provisional Application No. 63/074,089, filed on Sep. 3, 2020, which is hereby incorporated by reference herein in its entirety.

TECHNICAL FIELD

The present invention relates to the use of or administration of hemolymph, or a component of hemolymph, in cosmetics, skincare, supplements, nutrition, pharmaceutical drugs and healthcare, for regenerating, repairing, or restoring the function of the skin barrier, for the purpose of providing therapeutic, symptomatic relief, and cosmetic effects for applications falling within skin barrier restoration, wound healing and anti-aging effects.

BACKGROUND

It is not surprising that marine ingredients in cosmetics, nutrition and healthcare are of rising interest, due to often their multi-faceted mechanisms of action and high levels of efficacy in desired use cases. Such marine-derived compounds are often a results of millions of years of evolution, becoming powerful elements in organisms' abilities to survive in such harsh environments as the ocean. Compounds including proteins, peptides, carbohydrates and bacterial strains found in plants and animals have recently seen a significant amount of activity in these fields, with compound sources providing an abundance of availability, clinical studies revealing increasingly more potential to benefit mammalian health, and the general populations' attitude toward natural and sustainable products becoming increasingly more favorable.

One untapped source of potential is that of the arthropod and mollusk family, with entire fishing industries dedicated to the catch and sale of meat derived from these sources, which produce immense amount of waste, as components not converted into viable products and sold into market are commonly disposed of in landfills or feed back into the environment. In many cases, the waste-byproducts of the processes offer an array of commercially viable applications beneficial to our society's needs. This potential is often not taken advantage of due to inability of the producer of traditional goods to realize such value-added opportunities, the inability of the producer to implement a viable process to convert these byproducts into value-added products, or the general lack of scientific exploration into such value-added opportunities to understand that they exist. It is believed that one of these untapped sources of potential lies in the use of hemolymph, or components of hemolymph, derived from arthropods or mollusks.

Hemolymph is a natural substance derived from arthropods and mollusks including lobsters, crabs, and oyster species. Certain formulations are known which contain hemolymph, or a glycoprotein found within the hemolymph, called hemocyanin for various uses.

One industry, with waste materials abundant and ripe for innovation, is the lobster industry. The lobster industry brings in millions of pounds of lobster per year in areas around the world, predominantly along North America's east coast—with Maine lobstermen bringing in over 119 million pounds of meat in 2018. In the processing of these lobsters, the meat is the primary component of interest, with other components such as the shell and hemolymph viewed as waste. It is estimated that at this volume of catch, between 1-5 million pounds of hemolymph is wasted, trickling down the drain, each year.

Similar industries involving the farming or catch of marine organisms such as oyster farming in the state of Maine, are growing at promising rates, offering additional streams of hemolymph that have potential, due to variance in biochemical structure, to possess superior strength in applications in comparison to hemolymph, or hemolymph components, from other marine sources. Organisms that are invasive and harmful to marine environments, such as the green crab, also offer streams of hemolymph, which if a strong enough commercial application of the hemolymph existed, could encourage the establishment of processes to collect it, which could yield a high-value product that simultaneously results in the safety and preservation of marine environments. Thus, it is clear that hemolymph from such sources should be explored and value-added applications, such as the ones described in this patent, be validated, documented and commercialized.

When skin is exposed to stressors and damage, both external and internal, physical and chemical, the skin barrier can become compromised, which presents in a wide variety of manners. For physical stressors ranging from surgical incisions to sunburns, and conditions ranging from keratosis pilaris to plantar hyperkeratosis, a versatile topical ingredient is needed possessing skin properties that regenerate skin and help return elements of the skin barrier to their normal function. A wide range of complications can occur in the skin as a result of barrier damage or an alteration in barrier function; texture may be altered, skin tone or color altered, the appearance of aged skin may be more exacerbated or accelerated, skin may experience cracking, weeping or oozing, and wounds may form and take long to heal, introducing the potential for additional complications to manifest. An ingredient capable of addressing such concerns from the pharmaceutical to cosmetic level is needed to ensure proper care.

In previous work, we have discussed the use of hemolymph, or a moiety or protein found within the hemolymph from arthropods and mollusks, to reduce transepidermal water loss and inflammation in mammalian skin. Here, through unexpected results found in in vitro work as well as in vivo results relating to the regeneration of the epidermis and dermis, as well as positive results with abundance of conditions and symptoms relating to damage to the skin barrier or disruptions in skin barrier function, such a versatile ingredient has been discovered capable of delivering the skin regenerating, and skin barrier function restoring properties necessary for the applications described above. By leveraging one or more of the capabilities of hemolymph, or component within the hemolymph, to regenerate, repair, or restore the function of the skin barrier, beneficial therapeutic or cosmetic effects may be realized in a mammalian subject.

SUMMARY OF THE INVENTION

In one embodiment, the present disclosure provides a novel use of arthropod hemolymph, and components thereof, as an ingredient or the active ingredient independently or mixed in formulations administered by way of parenteral, oral, nasal, ocular, transmucosal, and transdermal routes, to deliver a cosmetic, symptomatic relief, pharmaceutical drug, nutritional or general benefit to mammalian health. The invention relates to preparations, intended uses, formulations, intended outcomes as a result of use, of hemolymph, or components thereof, rendered preferably, but not exclusively, from lobsters, oysters, crabs or mollusks.

This technology provides a chemical composition comprising a marine ingredient with the capabilities of regenerating, repairing, or restoring the function of the skin barrier for mammalian skin.

The hemolymph, hemocyanin or moiety found within hemolymph is useful for topical skin applications, due to its multi-faceted mechanisms of action working in unison together to deliver the desired activity relating to regenerating, repairing, or restoring the function of the skin barrier in any or all therapeutic, symptomatic relief or cosmetic applications. Additionally, the hemolymph, hemocyanin or moiety found within hemolymph is a sustainably and ethically sourced ingredient, a critical factor playing to the modern consumer's preference towards sustainability.

A method for regenerating, repairing, or restoring the function of the skin barrier is described, comprising the steps of: (a) providing a composition comprising hemolymph or a moiety found in hemolymph; and (b) administering the composition to the mammal. In a preferred embodiment, the composition is a topical composition administered topically to the skin.

DETAILED DESCRIPTION

This invention relates to the use of hemolymph, hemocyanin, or other moieties found within hemolymph from arthropods, mollusks and recombinantly produced versions of such moieties, having the capability of regenerating, repairing, or restoring the function of the skin barrier, used for the purpose of providing therapeutic, symptomatic relief and/or cosmetic effects to a mammal.

This invention further comprises the administration of hemolymph, a moiety found in hemolymph, a fragment or component of said moiety including but not limited to (preferably) the glycoprotein called hemocyanin, or peptides, used for the purpose of providing therapeutic, symptomatic relief, and/or cosmetic effects to a mammal, by leveraging one or more of the capabilities of regenerating, repairing, or restoring the function of the skin barrier.

In one aspect, the development, and developed viable products, using hemolymph and hemolymph components found in the lobster as an ingredient, or the active ingredient, in cosmetic, skincare, supplements, nutritional supplements and products, pharmaceutical drugs and general healthcare applications, is described. Through investigational preliminary laboratory data and anecdotal evidence supporting the feasibility of these applications, it is believed 1-5 million of pounds of hemolymph, and components found within the hemolymph, can be converted into high-value ingredients and products to provide industries such as the lobster industry with a significantly value-added revenue stream.

Hemolymph may be extracted following a variety of procedures. In a preferred embodiment, hemolymph may be obtained from lobsters as mentioned in U.S. Pat. No. 9,078, 906 B2, herein incorporated by reference. U.S. Pat. No. 9,078,906 describes use of hemolymph for antiviral and antineoplastic applications.

The form of hemolymph, or component of hemolymph, used in such products, can vary greatly. Numerous components found within the hemolymph have been shown to possess medicinal applications, such as the hemocyanin or peptides, which could give rise to motivation for using the hemolymph in its naturally-derived state, or isolating such components for more specific use.

In certain preferred embodiments, the components within the hemolymph, such as hemocyanin or peptides, may be isolated or purified in some manner. For components such as hemocyanin or peptides, this may occur using an array of typical purification methods, including, but not limited to, a form of chromatography such as affinity, high pressure liquid, ion-exchange or gel-filtration chromatography, dialysis, electrophoresis methods such as gel or two-dimensional electrophoresis, SDS-PAGE, precipitation, 'salting out', isoelectric focusing, immunoblotting, centrifugation, ultracentrifugation, enzymatic cleavage or solid-phase extraction.

Hemolymph, or hemolymph components, as derived naturally or from their respective isolation or purification techniques, could be incorporated into a formulation in crude form as-is, or further cleared of debris or contaminants with any known filtration technique, or converted from liquid to powder form using a process such as lyophilization, or combined with an array of ingredients to complement the efficacy, stability or other properties relating to a preferred use as a product.

The method of hemolymph component purification is certainly tailored to the component of interest, and the method may vary depending on intended component use; however, the true novelty does not lie in the isolation or purification process, rather, the preferred use of the component.

The hemolymph, hemocyanin or other moiety found within hemolymph may be administered independently (just the hemolymph, hemocyanin, or said moiety) or in a chemical composition, which may be delivered to a mammal via any mechanism of delivery.

The hemolymph, hemocyanin or other moiety found within hemolymph used may be obtained through natural (collected from an arthropod or mollusk) or recombinant (produced via culture in bioreactor) means. Such sources, from arthropods and mollusks, may include but are not limited to lobsters, crabs, oysters and mollusks, such as lobster species *Nephrops novegicus, Homarus gammarus, Panularis elephas* and *Homarus americanus*, as well as oyster species *Crassostrea virginica* and *Ostrea edulis*, crab species *Carcinus maenas, Portunus pelagicus, Portunus trituberculatus, Callinectes sapidus, Cancer pagurus, Metacarcinus magister* and *Chionoecetes*, crawfish species *Procambarus clarkii* and *Procambarus zonangulus*, shrimp species *Penaeus monodon, Pandalus borealis, Acetes japonicus* and *Trachysalambria curvirostris*, and mollusk classes gastropoda, bivalvia and cephalopoda.

The hemolymph, hemocyanin or other moiety found within hemolymph may be used as naturally obtained from the natural or recombinant source (un-modified form), an isomer, subunit, component, or fragment of hemocyanin, a functionalized form, a modified form, a glycosylated form, a form resuspended in a physiologically acceptable buffer or lyophilized form, or prepared in any other method.

One preferred way to practice the invention is to incorporate the hemolymph, hemocyanin or moiety found within hemocyanin to a composition as a delivery vehicle for topical administration to mammalian skin.

Delivery System

Suitable dosage forms include tablets, capsules, solutions, suspensions, powders, gums, and confectionaries. Sublingual delivery systems include, but are not limited to, dissolvable tabs under and on the tongue, liquid drops, and beverages. Edible films, hydrophilic polymers, oral dissolvable films or oral dissolvable strips can be used. Other useful delivery systems comprise oral or nasal sprays or inhalers, and the like.

For oral administration, the compounds or extracts may be combined with one or more solid inactive ingredients for the preparation of tablets, capsules, pills, powders, granules or other suitable dosage forms. For example, the active agent may be combined with at least one excipient such as fillers, binders, humectants, disintegrating agents, solution retarders, absorption accelerators, wetting agents, absorbents, or lubricating agents. Other useful excipients include magnesium stearate, calcium stearate, mannitol, xylitol, sweeteners, starch, carboxymethylcellulose, microcrystalline cellulose, silica, gelatin, silicon dioxide, and the like.

Further for oral administration, the compounds or extracts may be incorporated with an excipient and used in the form of ingestible tablets, buccal tablets, troches, capsules, elixirs, suspensions, syrups, wafers, and the like. The tablets, troches, pills, capsules, and the like can also contain the following: a binder such as gum tragacanth, acacia, corn starch, or gelatin; excipients such as dicalcium phosphate; a disintegrating agent such as corn starch, potato starch, alginic acid, and the like; a lubricant such as magnesium stearate; and a sweetening agent such as sucrose, lactose, or saccharin can be added or a flavoring agent such as peppermint, oil of wintergreen, or cherry flavoring. When the dosage unit form is a capsule, it can contain, in addition to materials of the above type, a liquid carrier. Various other materials can be present as coatings or to otherwise modify the physical form of the dosage unit. For instance, tablets, pills, or capsules can be coated with shellac, sugar, or both. A syrup or elixir can contain the active compound, sucrose as a sweetening agent, methyl and propylparabens as preservatives, a dye, and flavoring such as cherry or orange flavor. Oil-in-water emulsions may be better suited for oral use in infants because these are water-miscible, and thus their oiliness is masked. Such emulsions are well known in the pharmaceutical sciences.

Routes of Administration

The compounds or extracts may be administered by any route, including but not limited to oral, sublingual, buccal, ocular, pulmonary, rectal, and parenteral administration, or as an oral or nasal spray (e.g. inhalation of nebulized vapors, droplets, or solid particles). Parenteral administration includes, for example, intravenous, intramuscular, intraarterial, intraperitoneal, intranasal, intravaginal, intravesical (e.g., to the bladder), intradermal, transdermal, topical, or subcutaneous administration. Also contemplated within the scope of the invention is the instillation of hemolymph in the body of the patient in a controlled formulation, with systemic or local release of the drug to occur at a later time. For example, the drug may be localized in a depot for controlled release to the circulation, or for release to a local site of a growth or area of concern.

Regardless of application; therapeutically used to address a pathology, to mitigate symptoms, or for cosmetic effects, the composition may be comprised of a number of additional ingredients that provide complementary or supplementary effects, and delivered through any vehicle and method desired. Potential delivery mechanisms include, but are not limited to parenteral, oral, transmucosal, transdermal or topical routes; via intravenous, subcutaneous, intrathecal, intramuscular or site-specific ingestion routes, as a solution, suspension or emulsion, liquid suspension, physical mixture, encapsulated liquid suspension, encapsulated physical mixture, spray, topical liquid, emulsion, suspension, ointment, encapsulation, gelling systems, micelle, dendrimer, liposome, nanoparticle or time delivery system, dendrimers, liposomes, rectally, vaginally, buccally, or applied to the skin as a gel, cream, ointment, powder, emulsion, paste, spray, suspension, foaming agent, serum, shampoo, wax, balm, emollient, oil, lotion, woven into a fabric, band-aid, patch-test or suspended within an encapsulation.

In an embodiment, the invention relates to a chemical composition comprising at least hemolymph, a moiety found in hemolymph, a fragment or component of said moiety including but not limited to (preferably) hemocyanin or peptides, having the capability of regenerating, repairing, or restoring the function of the skin barrier, used for the purpose of providing therapeutic, symptomatic relief and/or cosmetic effects to a mammal.

The hemolymph or moiety (glycoprotein, hemocyanin) found within hemolymph used may be obtained through natural (collected from an arthropod or mollusk) or recombinant (produced via culture in bioreactor) means, as discussed herein, and may be used in a composition.

In one embodiment, the composition may be used in therapeutic, symptomatic relief, or cosmetic applications of regenerating, repairing, or restoring the function of the skin barrier relating to skin texture. Such applications may include decreasing roughness, increasing smoothness, increasing softness, modulating the number, feel and amount of pores, decreasing the feel and appearance of bumps, decrease, prevent or mitigate signs of bumps due to acne, keratosis pilaris, or other skin conditions, decreasing the feel and appearance of bumps, decrease, prevent or mitigate signs of bumps caused by friction or shaving, minimize, prevent or visually decrease signs of bumps caused by hair follicle growth or an excess of keratin, preventing, minimize or decreasing the appearance of bumps due to folliculitis, decrease the texture and feel of hemorrhoids, decreasing the feel and appearance of scaly skin, lumps, nodules, pustules, sores and calluses, panniculitis, modulate effects of discoid lupus erythematosus on skin texture, minimizing the appearance of blemishes, restoring a change in skin texture or appearance associated with Lichens Sclerosis.

In another embodiment, the composition may be used in therapeutic, symptomatic relief, or cosmetic applications of regenerating, repairing, or restoring the function of the skin barrier relating to skin color. Such applications may include modulating skin tone, restoring skin that is discolored, modulating pigmentation, improving dark spots, restoring skin affected by vitiligo to normal color, decreasing the appearance of under eye circles, and restoring under eye circle color back to normal skin tone.

In another embodiment, the composition may be used in therapeutic, symptomatic relief, or cosmetic applications of regenerating, repairing, or restoring the function of the skin barrier relating to keratinization or desquamation. Such applications may include increasing fibroblast, dermal or epidermal skin cell adherence, decreasing skin flaking, decreasing or preventing skin peeling, decreasing or preventing skin flaking, decreasing or preventing dandruff formation, reducing the presence or appearance of dandruff.

In another embodiment, the composition may be used in therapeutic, symptomatic relief, or cosmetic applications of regenerating, repairing, or restoring the function of the skin barrier relating to aging or aged skin. Such applications may include reducing puffiness, improving or modulating elasticity, increasing or modulating firmness, increasing suppleness, creating visibly younger skin, increasing collagen synthesis, increasing elastin synthesis, protecting the skin against oxidative stress, protecting or maintaining skin or skin cell viability exposed to cold, protecting skin from or diminishing effects of frostbite, diminishing the appearance of fine lines, improving the appearance of weathered skin, modulating skin tightness, diminishing the depth of wrinkles, mitigating cell senescence, modulating skin plumpness, modulating skin shininess, helping prevent further aged spots, modulating skin resilience, increasing skin energy levels, and modulating skin greasiness.

In another embodiment, the composition may be used in therapeutic, symptomatic relief, or cosmetic applications of regenerating, repairing, or restoring the function of the skin barrier relating to skin cell function. Such applications may include stimulating sebocyte proliferation or differentiation, repair skin DNA, helping preserve stem cells, b-islet cells, red blood cells, adipocytes, platelets, and restoring the skin to a normal pH.

In another embodiment, the composition may be used in therapeutic, symptomatic relief, or cosmetic applications of regenerating, repairing, or restoring the function of the skin barrier relating to skin weeping, oozing or other abnormal skin exudations.

In another embodiment, the composition may be used in therapeutic, symptomatic relief, or cosmetic applications of regenerating, repairing, or restoring the function of the skin barrier relating to skin wound healing. Such applications may include increasing fibroblast proliferation, increasing fibroblast viability, increasing keratinocyte proliferation, including keratinocyte viability, cracking, blisters, ulcers, cuts, protect or promote the survival of skin cells in areas of reconstituted epithelial or dermal skin cells, improve skin healing in areas where explants or grafts have been introduced, cracked heels, abrasions, punctures, lacerations, avulsions, plantar hyperkeratosis, diabetic foot ulcers, diabetic blisters, diabetic dermopathy, keratinization disorders, post-surgical incision care, repairing the skin barrier as an after-shave post-shave, aiding in the healing or acceleration of wound closure, accelerating, stimulating or soothing the scar formation process, visibly reducing the appearance of scars, and thickening or restoring thinned skin to normal thickness.

In another embodiment, the composition may be used in therapeutic, symptomatic relief, or cosmetic applications of regenerating, repairing, or restoring the function of the skin barrier relating to skin sun or radiation exposure care. Such applications may include preventing, reducing or reducing the appearance of sun spots, preparing the skin for sun tanning, increasing the effectiveness and degree of the skin tanning process, protecting skin cells that will undergo radiation, aid in skill cell and barrier repair in areas of skin that were exposed to radiation, helping soothe and repair skin damaged due to a sunburn, returning sunburnt skin to normal color, texture, sensitivity levels and thickness, helping soothe and repair skin damaged due to radiation exposure, turning radiation-exposed skin to normal color, texture, sensitivity levels and thickness, increasing or modulating the rate and effects of melanogenesis.

The material used in a composition made in accordance with the embodiments herein may be used as naturally obtained from the natural or recombinant source (un-modified form), an isomer, subunit, component, or fragment of hemocyanin, a functionalized form, a modified form, a glycosylated form, a form resuspended in a physiologically acceptable buffer or lyophilized form, or prepared in any other method.

Regardless of application; therapeutically used to address a pathology, to mitigate symptoms, or for cosmetic effects, the composition may be comprised of a number of additional ingredients that provide complementary or supplementary effects, and delivered through any vehicle and method desired. Potential delivery mechanisms include, but are not limited to Parenteral, Oral, Transmucosal, Transdermal/ Topical routes; via intravenous, subcutaneous, intrathecal, intramuscular or site-specific ingestion routes, as a solution, suspension or emulsion, liquid suspension, physical mixture, encapsulated liquid suspension, encapsulated physical mixture, spray, topical liquid, emulsion, suspension, ointment, encapsulation, gelling systems, micelle, dendrimer, liposome, nanoparticle or time delivery system, dendrimers, liposomes, rectally, vaginally, buccally, or applied to the skin as a gel, cream, ointment, powder, emulsion, paste, spray, suspension, foaming agent, serum, shampoo, wax, balm, emollient, oil, lotion, band-aid, patch-test or suspended within an encapsulation.

Hemolymph extracts or fractions are useful for the present invention.

Process for Preparing Hemocyanin Active Ingredient (Natural Hemocyanin)

In one embodiment, the hemocyanin may be obtained from a natural source (e.g. from arthropods), and prepared in a method, as follows.

The hemolymph of the arthropod is collected via vacuum or gravity feed into a holding container. This can be accomplished in a number of ways; the arthropod or mollusk, preferably lobster, can be lanced in easily penetrable or soft areas, including across the abdomen area adjacent to the swimmerets, allowing for hemolymph to drain, a needle may be inserted to allow for hemolymph to gravimetrically drain or be vacuum drained, the lobster may be placed on an mechanical or stationary lancing and flow system that lances the underbelly and directs hemolymph flow into a basin, the lobster abdomen may be separated from the thorax, as performed in traditional seafood processing, and the resulting hemolymph flow draining out may be directed into a basin.

The preferred methods of hemolymph collection are via vacuum system, using a sterilized 16 gauge needle attached to a tube which feeds into a collection basin, drawing hemolymph at a rate between 80-160 mL/min. Additionally, it is preferred to use an automated or stationary lancing and flow system, where the lobster may be manually lanced by an operator using a needle or sharp edge and placed onto a holder which allow hemolymph to flow and directs said flow into a collection basin, or, the operator may place the lobster on the holder, which employs a stationary or mechanically actuated lancing needle or sharp edge, thus allowing for full automation of the lancing and hemolymph flow into basin process. Finally, a third preferred method of hemolymph collection simply involves the use of a needle attached to a temporary collection vessel, such as a syringe or tube attached to a bulb, to draw the hemolymph from the lobster and subsequently deposit the hemolymph into a storage basin.

The collected hemolymph can be immediately stored in a −20° C. freezer (to be later thawed and subjected to the following step), allowed to sit in ambient conditions for no longer than two hours, in which the hemolymph clotting cascade naturally forms layers of clotted cellular mass/debris and a hemocyanin rich liquid layer, or the hemolymph is immediately subjected to chemical or physical perturbation to further activate the clotting cascade and expedite the formation of the solid and liquid layers.

Once the solid and liquid layers are formed, they may then be separated via centrifugation and decanting the liquid layer, filtration (vacuum, flow, gravimetric through a membrane, porous material, filter, etc.) to isolate the liquid layer, siphoning, draining, or another form of separation to remove the solid layer and isolate the liquid, hemocyanin-rich layer.

Preferably, the solid layer is filtered out by gravimetric or vacuum flow through a 0.22-40 μm filter, allowing the filter to remove the large solid particulates in solid phase, resulting in a clear, hemocyanin-rich liquid phase.

An additional preferable method to isolate the hemocyanin-rich liquid phase may be to centrifuge the hemolymph at between 1,000 g-12,000 g for between 5-60 minutes at a temperature between 4-20° C., and decant the supernatant to obtain the hemocyanin-rich liquid layer.

The concentration of hemocyanin suspended in the resulting hemocyanin-rich liquid layer may be of interest and can be assessed by any normal means of measuring protein concentration. Preferably, absorbance, refractometry and the Bradford assay are used to measure protein concentration. Hemocyanin, regardless of the source, displays unique absorbance bands are 280 nm and 350 nm. If absorbance is used, the 280 nm is the most accurate and reliable measure of concentration, as the 350 nm peak may vary depending on the degree of oxygenation of hemocyanin in solution. Therefore, more preferably, refractometry may be used to assess hemocyanin concentration by way of estimation of total protein content. Hemocyanin, depending on the source, accounts for between 90-99.9% of the total protein content, therefore refractometry is a simple high-level means of assessment. Finally, the Bradford assay may be used to measure protein content, following a standard procedure to measure concentration.

With the hemocyanin-rich layer isolated, a number of steps may be performed based on the required degree of standardization and purification of the end ingredient used in a composition.

In one embodiment, the hemocyanin-rich liquid layer may be used as obtained from the filtration step, where the protein content of the hemocyanin-liquid layer obtained from filtration is generally 90-99.9% hemocyanin.

In another embodiment, the hemocyanin-rich liquid may be subjected to lyophilization to obtain a dried form of the solution components, primarily being hemocyanin. One may elect to add a sugar to the hemocyanin-rich liquid to enhance protein thermal stability, thus decreasing the likeliness of denaturing and unfolding during the freezing and dehydration process. Preferably, sucrose or trehalose are added to the solution, at an amount of 10-800% 10-800% w/w sugar to hemocyanin, ideally 20-80% sucrose w/w hemocyanin and 50-600% trehalose w/w hemocyanin. However, it is possible for the hemocyanin-rich layer to be lyophilized without the addition of a sugar. The solution should be lyophilized for at least 8 hours and can be performed at a range of temperatures preferably between −80° C. and −50° C. (Zanjani, et al., Formulation of abalone hemocyanin with high antiviral activity and stability, European Journal of Pharmaceutical Sciences (2014) 53 (1), 77-85. https://doi.org/10.1016/j.ejps.2013.11.013).

In a third embodiment, the hemocyanin-rich liquid layer may be diluted based on the concentration of hemocyanin in solution, to meet a concentration standard set by those preparing the end composition. In an example, the hemocyanin-rich liquid layer may be diluted in distilled water, saline, PBS or another solution commonly used in cosmetics and biotechnology, preferably a physiologically acceptable, non-toxic, non-irritating solution.

In a fourth embodiment, the hemocyanin may be further purified to remove or isolate the protein from the liquid layer. To do so, a number of physical and chemical separation methods may be employed to remove the protein from solution, including centrifugation, ultracentrifugation, precipitation, filtration, chromatography or any other physical or chemical method to isolate the protein from solution.

Precipitation, also referred to as 'salting out' is one preferred method of hemocyanin purification, as the method, especially considering the utilization of ammonium sulfate, is ideal for use in scaling up and large-scale purification, being relatively simple, cost-effective, and allowing for large, continuous quantities of raw material to be purified. While an array of salts may be used, ammonium sulfate is preferred for a precipitation procedure. Following a simple method described by Nichols et al., and well known in the field of protein purification, ammonium sulphate crystals can be continuously added to hemocyanin-rich solution an stirred over a period of 12 hours, at 4 C, to reach 50% ammonium sulphate saturation, followed by centrifuging the solution at 10,000 rpm at 4° C. for one hour, decanting, resuspending the pellet and repeated 2-3 times to ensure purity. Following this, the solution was dialyzed against a suitable stabilizing buffer to remove ammonium sulfate and obtain hemocyanin in solution, and finally filtered with a 0.22-0.4 μm filter to sterilize (K. Idakieva, et al. Purification of Hemocyanin from Marine Gastropod *Rapana Thomasiana* using Ammonium Sulfate Precipitation Method, *Biotechnology & Biotechnological Equipment* (2009) 23:3, 1364-1367, DOI: 10.1080/13102818.2009.10817671).

Ultracentrifugation may also be used to isolate the hemocyanin from the hemocyanin-rich liquid, following a simple procedure of centrifuging the solution between 20,000-80,000 rpm, preferably between 30,000-50,000 rpm, at 5° C. for a timespan between 1-18 hours (Guo, D., et al. Functional properties of hemocyanin from *Oncomelania hupensis*, the intermediate host of *Schistosoma japonicum*. *Experimental Parasitology* (2009) 123 (3), 277-281; Keller, H., et al. Abalone (*Haliotis tuberculata*) hemocyanin type 1 (HtH1), *Eur. J. Biochem*. (1999) 264:27-38).

While precipitation may be an ideal method to isolate the hemocyanin from an economic, scale and simplicity standpoint, the hemocyanin may be purified through a number of different means, including SDS-PAGE, gel or affinity chromatography, HPLC and other forms of protein purification, all of which have been fairly explored in the isolation of hemocyanin from various crustaceans by numerous research groups, and can be performed using standard procedures by those well versed in the art of protein purification.

Regardless of the purification step, once the hemocyanin is isolated (if such a series of steps is desired for use), it may be resuspended in another solution commonly used in cosmetics and biotechnology, including saline, PBS, or preferably another physiologically acceptable, non-toxic, non-irritating solution. Additionally, the hemocyanin may be subjected to lyophilization following the previously mentioned lyophilization procedure obtain a dried, solid form.

The purity of the resulting hemocyanin may be assessed using SDS-PAGE, gel chromatography, TEM, Western Blot, absorption spectroscopy and other analytical techniques commonly practiced in the field of protein purification and characterization, following standard procedures. In chromatography procedures, as hemocyanin is most abundant in the lobster as a ~75 kDa protein, it is recommended that standards such as ovalbumin, beta-galactosidase and ovotransferrin are used, having similar weights to the hemocyanin protein and thus allowing for close and accurate standards to compare to. For absorbance spectroscopy, as previously mentioned, 280 nm should be used to assess the concentration of hemocyanin, referencing an equation for concentration obtained by plotting Bradford assay concentration measurements against absorbance and relating the two measurements to a known concentration.

Additional steps may be employed to modulate or enhance the desired activity or efficacy of the hemocyanin, or hemocyanin-rich liquid, including obtaining a certain isoform, glycoform or subunit assemblies. As previously mentioned, sugars such as sucrose and trehalose may be added to the hemocyanin-rich liquid, or a solution of purified resuspended hemocyanin, to further glycosylate the protein, which may be advantageous both for enhanced thermal stability as well as enhanced efficacy in certain use cases.

In some cases, it may be of interest to isolate and utilize specific subunit arrangements of hemocyanin, in which a standard method to isolate the subunit may be followed, preferably using affinity chromatography or pH modulation as the simplest means to obtain either a single subunit, or the desired subunit aggregation state. The single lobster hemocyanin subunit is known to weigh roughly 75 kDa, often arranging as a monomer, and as hexamers and dodecamers.

Molon et al. showed how raising a hemocyanin-containing solutions' pH to 9 resulted in nearly 100% dissociation of hemocyanin aggregation states, therefore obtaining a solution of nearly 100% hemocyanin monomers (Molon, et al., Molecular heterogeneity of the hemocyanin isolated from the king crab Paralithodes camtschaticae, Eur. J. Biochem. (2000) 267:7046-7057). Correspondingly, by lowering the pH and adding $Ca^{2+}$ resulted in the reassociation of the subunits into dodecamer and hexamer forms. Interestingly, Pan et al. demonstrated how between the dodecamer and hexamer, the dodecamer is primarily found in freshly pooled hemolymph, however, upon storing at 4° C. for 3 days, the hexamer became the main form, which evidently was more stable, suggesting that temperature may also be modulated to obtain the desired subunit aggregation state (Pan, J. Y., et al., Dodecamer is required for agglutination of *Litopenaeus vannamei* hemocyanin with bacterial cells and red blood cells, Marine Biotechnology (2008) 10 (6), 645-652. https://doi.org/10.1007/s10126-008-9115-8).

It has been shown that hemocyanins that exhibit impressive polymorphism (in other arthropods) result in protein isoforms that better suited for certain healthcare or biotechnology applications. Additionally, numerous studies have linked hemocyanin glycoform, the specific type or extent of the protein glycosylation, to efficacy on a broad spectrum from pathology treatment to altering cosmetic appearances, which is of specific interest for a range of applications within regenerating, repairing, or restoring the function of the skin barrier, where glycoprotein degree of glycosylation plays a major factor in skin barrier regeneration. This has been demonstrated through various mechanisms both in vitro and in vivo, giving rise to this exciting and heretofore unexpected breakthrough. Finally, the hemocyanin subunit arrangement from monomer to hexamer and dodecamers may result in altered efficacy depending on the specific use case and mode of delivery, therefore altering the pH or utilizing another separative technique to isolate the clusters of subunits in varying arrangements may be advantageous.

Therefore in this invention, what may be used as the 'active' or 'key' ingredient includes a hemocyanin-rich liquid obtained as naturally obtained from hemolymph, a hemocyanin-rich liquid diluted to a desired concentration, a hemocyanin-rich liquid containing the desired hemocyanin isoform, glycoform or subunit aggregation state, a purified hemocyanin isolated from the liquid in dried form or resuspended in a new solution, or a purified hemocyanin with desired isoform, glycoform or subunit aggregation state.

Process for Preparing Hemocyanin Active Ingredient (Recombinant Hemocyanin)

In another embodiment, the hemocyanin used for the described applications may be recombinantly produced via large scale bioreactor fermentation. The recombinant protein or peptide, or portions thereof, may share at least 85% sequence identity compared to wild-type hemocyanin of arthropods or mollusks. Alternatively, the recombinant protein or peptide, or portions thereof, may share at least 90% sequence identity, or 91%, 92%, 93%, 94%, 95%, 96%, 97%, 98%, 99%, or greater, sequence identity compared to wild-type hemocyanin of arthropods or mollusks.

This can be accomplished following a standard recombinant protein production procedure. First, one must understand the DNA sequence that codes for the hemocyanin, or hemocyanin subunit of interest, and obtain the RNA from the original arthropod or mollusk source. A fragment can be cut and inserted into a suitable vector. This vector is introduced into a suitable host system (in vitro, *E. Coli*, Yeast, Mammalian Cell), and the system is transformed to express the DNA encoding for the desired hemocyanin or hemocyanin subunit. Following small scale tests to ensure the correct protein is expressed (measurable by simple and standard assays including ELISA and Western Blots) in the desired range of yield, production can be scaled up to fermentation in a large bioreactor.

Glycoproteins can be purified from solution by lysis of culture cells, centrifuging the solution and decanting the supernatant containing the glycoprotein. Presence, purity, concentration and other relevant information pertaining to the produced glycoprotein can analyzed using SDS-PAGE, gel chromatography, TEM, Western Blot, absorption spectroscopy and other analytical techniques commonly practiced in the field of protein purification and characterization.

Following the collection and purification of the resulting protein, again, additional steps may be taken to result in optimal isoforms or optimally glycosylated proteins, depending on the desired use case for the protein. A preferable modification to the resulting protein is glycosylation, which is more conveniently accomplished post-production as opposed to expression of the protein in a glycosylated form, or glycosylation in the reactor, where glycosylated forms of glycoproteins and hemocyanins have shown to possess enhanced efficacy related to various biomedical and cosmetic applications.

Thus, in these embodiments, the hemocyanin material used is a recombinant hemocyanin, or hemocyanin subunit, which may be further treated to shift the proteins towards a desired isoform, subunit assembly, or degree of glycosylation. This hemocyanin or hemocyanin subunit may be used as an active material that is suspended or resuspended in a desired solution or lyophilized and supplied in dried, powder form. In one embodiment, a hemolymph containing formulation or composition may contain hemocyanin in a dosage or amount ranging from about 1 ng to about 500 mg. In a preferred embodiment, a hemolymph containing formulation or composition may contain hemocyanin in a dosage or amount ranging from about 1.2 ng to about 472 mg.

The intended uses described herein range from cosmetic and nutritional products and supplements to products for mitigation of symptoms and pharmaceutical drugs, without limitation. Provided below are examples of patient diary data anecdotally documenting the result of using a topical formula containing hemolymph, for enhancing visual appearance and feeling of skin, and self-assessed mitigation of symptoms commonly associated with their self-assessed pathology.

In an embodiment, a hemolymph containing formulation may contain from about 0.05% to about 20% by weight hemolymph or a moiety found in hemolymph, such as, for example, a hemocyanin (e.g., marine glycoprotein), based on the total weight of the formulation. In an alternative embodiment, the hemocyanin (e.g., marine glycoprotein) can be used in the range of 0.0052-23% by weight in the above formulation.

Example 1

Fibroblast Viability and Proliferation

Cell viability and proliferation experiments were carried out via normal MTT assay procedure, described below (as shown in Table 1).

Fibroblasts were seeded into the individual wells of a 24-well plate in 0.5 ml of Fibroblast Growth Media (FGM) and incubated overnight at 37±2° C. and 5±1% $CO_2$. On the following day the media was removed via aspiration to eliminate any non-adherent cells and replaced with 0.5 ml of fresh FGM. The cells were grown until confluent, with a media change every 48 to 72 hours. Upon reaching confluency the cells were treated for 24 hours with DMEM supplemented with 1.5% FBS to wash out any effects from the growth factors included in the normal culture media. After this 24-hour wash out period the cells were treated with the test materials at the specified concentrations dissolved in FGM with 1.5% FBS. TGF-B (50 ng/ml) was used as a positive control for collagen and elastin, while 100 μM DbcAMP was used as a positive control for hyaluronic acid. Untreated cells (negative controls) just received DMEM with 1.5% FBS. The cells were incubated for 48 hours and at the end of the incubation period cell culture medium was collected and either stored frozen (−75° C.) or assayed immediately. Materials were tested in triplicate.

After the 2-day incubation, the cell culture medium was removed (see above) and the fibroblasts were washed twice with PBS to remove any remaining test material. After the final wash, 500 μl of DMEM supplemented with 0.5 mg/ml MTT was added to each well and the cells were incubated for 1 hour at 37±2° C. and 5±1% $CO_2$. After the incubation, the DMEM/MTT solution was removed and the cells were washed again once with PBS and then 0.5 ml of isopropyl alcohol was added to the well to extract the purple formazan crystals. Two hundred microliters of the isopropyl extracts were transferred to a 96-well plate and the plate was read at 540 nm using isopropyl alcohol as a blank.

The mean MTT absorbance value for the negative control cells was calculated and used to represent 100% cell viability. The individual MTT values from the cells undergoing the various treatments were then divided by the mean value for the negative control cells and expressed as a percent to determine the change in cell viability caused by each treatment.

TABLE 1

| Hemocyanin Glycoprotein Dosage (mg/mL) | Mean Viability |
| --- | --- |
| 2.5 | 139.8 |
| 0.25 | 120.1 |
| 0.0025 | 94.1 |

Example 2

Collagen Synthesis

Fibroblasts are the main source of the extracellular matrix peptides, including the structural proteins collagen and elastin. Procollagen is a large peptide synthesized by fibroblasts in the dermal layer of the skin and is the precursor for collagen. As the peptide is processed to form a mature collagen protein, the propeptide portion is cleaved off (type I C-peptide). Both the mature collagen protein and the type I C-peptide fragment are then released into the extracellular environment. As collagen is synthesized the type I C-peptide fragment accumulates into the tissue culture medium. Since there is a 1:1 stoichiometric ratio between the two parts of the procollagen peptide, assaying for type I C-peptide reflect the amount of collagen synthesized. Type 1 C-peptide can be assayed via an ELISA based method.

A series of type I C-peptide standards was prepared ranging from 0 ng/ml to 640 ng/ml. Next, an ELISA microplate was prepared by removing any unneeded strips from the plate frame followed by the addition of 100 μl of peroxidase-labeled anti procollagen type I-C peptide antibody to each well used in the assay.

Twenty (20) μl of either sample (collected tissue culture media) or standard was then added to appropriate wells and the microplate was covered and allowed to incubate for 3±0.25 hours at 37° C. After the incubation the wells were aspirated and washed three times with 400 μl of wash buffer. After the last wash was removed 100 μl of peroxidase substrate solution (hydrogen peroxide+tetramethylbenzidine as a chromagen) was added to each well and the plate was incubated for 15±5 minutes at room temperature. After the incubation 100 μl of stop solution (1 N sulfuric acid) was added to each well and the plate was read using a microplate reader at 450 nm.

To quantify the amount of each substance present, a standard curve was generated using known concentrations of the substance (collagen) of interest. A regression analysis was performed to establish the line that best fits these data points. Absorbance values for the test materials and untreated samples were used to estimate the amount of each substance present in each sample. Results are presented in Table 2.

TABLE 2

| Hemocyanin Glycoprotein Dosage Range (mg/mL) | % Collagen Synthesis Relative to Untreated |
| --- | --- |
| 2.5 | 35 |
| 0.25 | 1.1 |
| 0.0025 | −27 |

Example 3

Skin Roughness or Smoothness 74 individuals with rough skin, including Asian, African American, Hispanic, and White ethnicities, from toddler to 65+ age groups, topically applied a cream composition containing hemocyanin as shown in Table 3 to areas of the body affected by rough skin, including the Face, Neck, Scalp, Nose, Eyelid, Perioral, Armpit, Upper arm, Elbow, Forearm, Hand, Finger Stomach, Chest, Lower and Upper Back, Thigh, Shin, Knee, and Feet areas, daily. The composition contained Water (Aqua), Hemocyanin (Marine Glycoprotein), Butyrospermum Parkii Shea Butter Fruit, Cetyl Alcohol, Glyceryl Stearate, Glycerin, Caprylic/Capric Triglyceride, Sorbitan Oleate Decylglucoside Crosspolymer, Polyacrylamide, C13-14 Isoparaffin, Laureth-7, *Cocos Nucifera* (Coconut) Oil, Squalane, Tocopherol (Vitamin E), Hyaluronic Acid, Sodium Benzoate, Sodium Levulinate, Potassium Sorbate, and Sodium Phytate. The cream composition was applied topically to the skin on the affected skin surface (e.g., rough skin) using a dosage rate of approximately 1 gram of cream per about 4 sq. inches of skin surface area (1 g/4 in$^2$ Area), twice per day. User experiences were assessed by subjective participant self-reporting, and responses were collected at times users were able to confidently self-report significant results, ranging between 1-7 days of cream usage. Of this group, 100% reported their skin felt and appeared significantly less rough, and significantly softer and smoother.

TABLE 3

| Ingredient | Weight Percentage (%) |
|---|---|
| Water (Aqua) | 20-80% |
| Hemocyanin (Marine Glycoprotein) | 0.05-20% |
| *Butyrospermum Parkii* Shea Butter Fruit | 0.5-20% |
| Cetyl Alcohol | 0.1-20% |
| Glyceryl Stearate | 0.1-20% |
| Glycerin | 0.1-20% |
| Caprylic/Capric Triglyceride | 0.1-20% |
| Sorbitan Oleate Decylglucoside Crosspolymer | 0.1-20% |
| Polyacrylamide | 0.1-20% |
| C13-14 Isoparaffin | 0.1-20% |
| Laureth-7 | 0.1-20% |
| *Cocos Nucifera* (Coconut) Oil | 0.1-20% |
| Squalane | 0.1-5% |
| Tocopherol (Vitamin E) | 0.1-5% |
| Hyaluronic Acid | 0.1-5% |
| Sodium Benzoate | 0.01-5% |
| Sodium Levulinate | 0.01-5% |
| Potassium Sorbate | 0.01-5% |
| Sodium Phytate | 0.01-5% |

In an alternative embodiment, the Hemocyanin (Marine Glycoprotein) can be used in the range of 0.0052-23% by weight in the above formulation.

Example 4

Scaly Skin 26 individuals with scaly skin, including Asian, African American, Hispanic, and White ethnicities, from toddler to 65+ age groups, topically applied a cream composition containing hemocyanin as in Table 3 to areas of the body affected by scaly skin, including the Face, Neck, Scalp, Nose, Eyelid, Perioral, Armpit, Upper arm, Elbow, Forearm, Hand, Finger Stomach, Chest, Lower and Upper Back, Thigh, Shin, Knee, and Feet areas, daily. The cream composition was applied topically to the skin on the affected skin surface (e.g., scaly skin) as in Example 3. User experiences were assessed by subjective participant self-reporting, and responses were collected at times users were able to confidently self-report significant results, ranging between 1-7 days of cream usage. Of this group, 100% reported their skin felt and appeared significantly less scaly and rough, and significantly softer and smoother.

Example 5

Skin Tone or Discolored Skin 4 individuals with discolored skin, including Asian, African American, Hispanic, and White ethnicities, from toddler to 65+ age groups, topically applied a cream composition containing hemocyanin as in Table 3, according to Example 3, to areas of the body affected by discolored skin, including the Face, Neck, Scalp, Nose, Eyelid, Perioral, Armpit, Upper arm, Elbow, Forearm, Hand, Finger Stomach, Chest, Lower and Upper Back, Thigh, Shin, Knee, and Feet areas, daily. User experiences were assessed by subjective participant self-reporting, and responses were collected at times users were able to confidently self-report significant results, ranging between 1-7 days of cream usage. Of this group, 75% reported their skin color in affected areas appeared less patchy, and significantly restored back to normal skin color.

Example 6

Acne Bumps and Bumpy Pores 7 individuals with acne bumps or bumpy pores, including Asian, African American, Hispanic, and White ethnicities, from toddler to 65+ age groups, topically applied a cream composition containing hemocyanin as in Table 3, according to Example 3, to areas of the body affected by acne bumps or bumpy pores, including the Face, Neck, Scalp, Nose, Eyelid, Perioral, Armpit, Upper arm, Elbow, Forearm, Hand, Finger Stomach, Chest, Lower and Upper Back, Thigh, Shin, Knee, and Feet areas, daily. User experiences were assessed by subjective participant self-reporting, and responses were collected at times users were able to confidently self-report significant results, ranging between 1-7 days of cream usage. Of this group, 86% reported their skin texture was significantly less bumpy, acne and pores were significantly less visible, and skin was significantly softer and smoother.

Example 7

Flaking and Peeling Skin 37 individuals with flaking or peeling skin, including Asian, African American, Hispanic, and White ethnicities, from toddler to 65+ age groups, topically applied a cream composition containing hemocyanin as in Table 3, according to Example 3, to areas of the body affected by flaking or peeling skin, including the Face, Neck, Scalp, Nose, Eyelid, Perioral, Armpit, Upper arm, Elbow, Forearm, Hand, Finger Stomach, Chest, Lower and Upper Back, Thigh, Shin, Knee, and Feet areas, daily. User experiences were assessed by subjective participant self-reporting, and responses were collected at times users were able to confidently self-report significant results, ranging between 1-7 days of cream usage. Of this group, 97% reported their skin texture was significantly less rough and scratchy, skin was flaking and peeling significantly less, and skin was significantly softer and smoother.

Example 8

Wrinkles 28 individuals with aged skin, wrinkles or fine lines, including Asian, African American, Hispanic, and White ethnicities, from toddler to 65+ age groups, topically applied a cream composition containing hemocyanin as in Table 3, according to Example 3, to areas of the body with aged skin, wrinkles or fine lines, including the Face, Neck, Scalp, Nose, Eyelid, Perioral, Armpit, Upper arm, Elbow, Forearm, Hand, Finger Stomach, Chest, Lower and Upper Back, Thigh, Shin, Knee, and Feet areas, daily. User experiences were assessed by subjective participant self-reporting, and responses were collected at times users were able to confidently self-report significant results, ranging between 1-7 days of cream usage. Of this group, 96% reported their skin appeared significantly younger, wrinkles were significantly less visible and fine lines were significantly diminished.

Example 9

Weeping, Oozing, Exudations 10 individuals with weeping or oozing skin, including Asian, African American, Hispanic, and White ethnicities, from toddler to 65+ age groups, topically applied a cream composition containing hemocyanin as in Table 3, according to Example 3, to areas of the body with weeping or oozing skin, including the Face, Neck, Scalp, Nose, Eyelid, Perioral, Armpit, Upper arm, Elbow, Forearm, Hand, Finger Stomach, Chest, Lower and Upper Back, Thigh, Shin, Knee, and Feet areas, daily. User experiences were assessed by subjective participant self-reporting, and responses were collected at times users were able to confidently self-report significant results, ranging between 1-7 days of cream usage. Of this group, 100% reported their skin weeping and oozing was significantly reduced, and skin felt and appeared significantly healthier.

Example 10

Cracking and Cuts 26 individuals with cracking skin or cuts, including Asian, African American, Hispanic, and White ethnicities, from toddler to 65+ age groups, topically applied a cream composition containing hemocyanin as in Table 3, according to Example 3, to areas of the body with cracking skin or cuts, including the Face, Neck, Scalp, Nose, Eyelid, Perioral, Armpit, Upper arm, Elbow, Forearm, Hand, Finger Stomach, Chest, Lower and Upper Back, Thigh, Shin, Knee, and Feet areas, daily. User experiences were assessed by subjective participant self-reporting, and responses were collected at times users were able to confidently self-report significant results, ranging between 1-7 days of cream usage. Of this group, 100% reported their skin cracking was significantly reduced and visibly healed, cuts were visibly healed and skin felt and appeared significantly healthier.

Example 11

Wound and Scar Healing 57 individuals with skin wounds or scars, including Asian, African American, Hispanic, and White ethnicities, from toddler to 65+ age groups, topically applied a cream composition containing hemocyanin as in Table 3, according to Example 3, to areas of the body with skin wounds or scars, including the Face, Neck, Scalp, Nose, Eyelid, Perioral, Armpit, Upper arm, Elbow, Forearm, Hand, Finger Stomach, Chest, Lower and Upper Back, Thigh, Shin, Knee, and Feet areas, daily. User experiences were assessed by subjective participant self-reporting, and responses were collected at times users were able to confidently self-report significant results, ranging between 1-7 days of cream usage. Of this group, 91% reported their skin wounds were visibly reduced and significantly healed, scars were visibly reduced and significantly healed, and skin felt and appeared significantly healthier.

Example 12

Sun Spots 27 individuals with sun spots, including Asian, African American, Hispanic, and White ethnicities, from 18-27 to 65+ age groups, topically applied a cream composition containing hemocyanin as in Table 3, according to Example 3, to areas of the body with sun spots, including the Face, Neck, Scalp, Nose, Eyelid, Perioral, Armpit, Upper arm, Elbow, Forearm, Hand, Finger Stomach, Chest, Lower and Upper Back, Thigh, Shin, Knee, and Feet areas, daily. User experiences were assessed by subjective participant self-reporting, and responses were collected at times users were able to confidently self-report significant results, ranging between 1-7 days of cream usage. Of this group, 96% reported their sun spots were visibly reduced and significantly healed, the skin color and tune returned to normal, and skin felt and appeared significantly healthier.

Example 13

Sunburn and Radiation Exposure Care 31 individuals with sunburn or radiation exposure, including Asian, African American, Hispanic, and White ethnicities, from 18-27 to 65+ age groups, topically applied a cream composition containing hemocyanin as in Table 3, according to Example 3, to areas of the body with sunburn or radiation exposure, including the Face, Neck, Scalp, Nose, Eyelid, Perioral, Armpit, Upper arm, Elbow, Forearm, Hand, Finger Stomach, Chest, Lower and Upper Back, Thigh, Shin, Knee, and Feet areas, daily. User experiences were assessed by subjective participant self-reporting, and responses were collected at times users were able to confidently self-report significant results, ranging between 1-7 days of cream usage. Of this group, 97% reported their sunburns or radiation exposure burns were visibly reduced and skin damaged by sun or radiation exposure was significantly healed, peeling was significantly reduced, skin was significantly less rough and scratchy, skin felt significantly softer and smoother, and felt and appeared significantly healthier.

The use of the terms "a," "an," "the," and similar referents in the context of describing the presently claimed invention (especially in the context of the claims) are to be construed to cover both the singular and the plural, unless otherwise indicated herein or clearly contracted by context. Recitation of ranges of values herein are merely intended to serve as a shorthand method of referring individually to each separate value falling within the range, unless otherwise indicated herein, and each separate value is incorporated into the specification as if it were individually recited herein. Use of the term "about" is intended to describe values either above or below the stated value in a range of approximately ±10%; in other embodiments the values may range in value either above or below the stated value in a range of approximately ±5%; in other embodiments the values may range in value either above or below the stated value in a range of approximately ±2%; in other embodiments the values may range in value either above or below the stated value in a range of approximately ±1%. The preceding ranges are intended to be made clear by context, and no further limitation is implied. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

While in the foregoing specification this invention has been described in relation to certain embodiments thereof, and many details have been put forth for the purpose of illustration, it will be apparent to those skilled in the art that the invention is susceptible to additional embodiments and that certain of the details described herein can be varied considerably without departing from the basic principles of the invention.

All references cited herein are incorporated by reference in their entireties. The present invention may be embodied in other specific forms without departing from the spirit or essential attributes thereof and, accordingly, reference should be made to the appended claims, rather than to the foregoing specification, as indicating the scope of the invention.

We claim:

1. A method for regenerating, repairing, or restoring the function of the skin barrier in a mammal, comprising the steps of:
   (a) providing a composition consisting essentially of hemocyanin derived from organisms selected from the group consisting of:
   lobster species selected from *Nephrops novegicus, Homarus gammarus*, or *Panularis elephas*, or *Homarus americanus,*
   crab species selected from *Carcinus maenas, Portunus pelagicus, Portunus trituberculatus, Callinectes sapidus, Cancer pagurus, Metacarcinus magister*, or *Chionoecetes;*
   crawfish species selected from *Procambarus clarkii* or *Procambarus zonangulus*; and
   shrimp species selected from *Penaeus monodon, Pandalus borealis, Acetes japonicas*, or *Trachysalambria curvirostris;*
   wherein hemocyanin is about 20% by weight based on the total weight of the composition; and
   (b) administering the composition to the mammal;
   whereby the skin is regenerated, repaired, or the function is restored to normal.

2. The method of claim 1, wherein the hemocyanin protein is a recombinant protein or peptide.

3. The method of claim 2, wherein the recombinant hemocyanin protein shares at least 85% sequence identity compared to a wildtype hemocyanin protein or peptide.

4. The method of claim 1, wherein the composition is a topical composition administered topically to the skin daily for about 1 day to about 7 days.

5. The method of claim 1, wherein the composition contains a dosage of hemocyanin from about 1 ng to about 500 mg.

6. The method of claim 1, wherein the skin regeneration or restoration aids in the treatment of skin texture for the following conditions: decreasing roughness, increasing smoothness, increasing softness, modulating the number, feel and amount of pores, decreasing the feel and appearance of bumps, decrease, prevent or mitigate signs of bumps due to acne, keratosis pilaris, or other skin conditions, decreasing the feel and appearance of bumps, decrease, prevent or mitigate signs of bumps caused by friction or shaving, minimize, prevent or visually decrease signs of bumps caused by hair follicle growth or an excess of keratin, preventing, minimize or decreasing the appearance of bumps due to folliculitis, decrease the texture and feel of hemorrhoids, decreasing the feel and appearance of scaly skin, lumps, nodules, pustules, sores and calluses, panniculitis, modulate effects of discoid lupus erythematosus on skin texture, minimizing the appearance of blemishes, restoring a change in skin texture or appearance associated with Lichens Sclerosis.

7. The method of claim 1, wherein the skin regeneration or restoration provides beneficial cosmetic effects to concerns of skin color, selected from modulating skin tone, restoring skin that is discolored, modulating pigmentation, improving dark spots, restoring skin affected by vitiligo to normal color, decreasing the appearance of under eye circles, and restoring under eye circle color back to normal skin tone.

8. The method of claim 1, wherein the skin regeneration or restoration addresses the concerns of keratinization or desquamation, selected from increasing fibroblast, dermal or epidermal skin cell adherence, decreasing skin flaking, decreasing or preventing skin peeling, decreasing or preventing skin flaking, decreasing or preventing dandruff formation, reducing the presence or appearance of dandruff.

9. The method of claim 1, wherein the skin regeneration or restoration provides beneficial cosmetic effects to concerns of aging skin, selected from reducing puffiness, improving or modulating elasticity, increasing or modulating firmness, increasing suppleness, creating visibly younger skin, increasing collagen synthesis, increasing elastin synthesis, protecting the skin against oxidative stress, protecting or maintaining skin or skin cell viability exposed to cold, protecting skin from or diminishing effects of frostbite, diminishing the appearance of fine lines, improving the appearance of weathered skin, modulating skin tightness, diminishing the depth of wrinkles, mitigating cell senescence, modulating skin plumpness, modulating skin shininess, helping prevent further aged spots, modulating skin resilience, increasing skin energy levels, and modulating skin greasiness.

10. The method of claim 1, wherein the skin regeneration or restoration aids in the treatment, of the skin where skin chemical properties or cellular functions are abnormal, selected from stimulating sebocyte proliferation or differentiation, repair skin DNA, helping preserve stem cells, b-islet cells, red blood cells, adipocytes, platelets, and restoring the skin to a normal pH.

11. The method of claim 1, wherein the skin regeneration or restoration aids in the treatment, of skin weeping, oozing or other abnormal exudations.

12. The method of claim 1, wherein the skin regeneration or restoration aids in the treatment, of skin barrier or wound healing, selected from increasing fibroblast proliferation, increasing fibroblast viability, increasing keratinocyte proliferation, including keratinocyte viability, cracking, blisters, ulcers, cuts, protect or promote the survival of skin cells in areas of reconstituted epithelial or dermal skin cells, improve skin healing in areas where explants or grafts have been introduced, cracked heels, abrasions, punctures, lacerations, avulsions, plantar hyperkeratosis, diabetic foot ulcers, diabetic blisters, diabetic dermopathy, keratinization disorders, post-surgical incision care, repairing the skin barrier as an after-shave post-shave, aiding in the healing or acceleration of wound closure, accelerating, stimulating or soothing the scar formation process, visibly reducing the appearance of scars, and thickening or restoring thinned skin to normal thickness.

13. The method of claim 1, wherein the skin regeneration or restoration provides beneficial cosmetic effects to concerns of sun and radiation exposure care, selected from preventing, treating or reducing the appearance of sun spots, preparing the skin for sun tanning, increasing the effectiveness and degree of the skin tanning process, protecting skin cells that will undergo radiation, aid in skill cell and barrier repair in areas of skin that were exposed to radiation, helping soothe and repair skin damaged due to a sunburn, returning sunburnt skin to normal color, texture, sensitivity levels and thickness, helping soothe and repair skin damaged due to radiation exposure, turning radiation-exposed skin to normal color, texture, sensitivity levels and thickness, increasing or modulating the rate and effects of melanogenesis.

14. The method of claim 4, wherein the skin of the mammal is regenerated after the topical administering step.

15. The method of claim 4, wherein the skin of the mammal is softer, smoother, less rough, less bumpy and the texture is restored to normal or improved after the topical administering step.

16. The method of claim 4, wherein collagen synthesis in the skin of the mammal is increased after the topical administering step.

17. The method of claim 4, wherein wrinkles and fine lines are diminished, and the skin of the mammal is more elastic, plump, supple, visibly younger and healthier looking after the topical administering step.

18. The method of claim 4, wherein the mammalian skin tone or color is restored to normal or improved after the topical administering step.

19. The method of claim 4, wherein damage to the mammalian skin, such as wounds, cuts, cracks and scars are healed after the topical administering step.

20. The method of claim 4, wherein fibroblast proliferation in mammalian skin is increased after the topical administering step.

21. The method of claim 4, wherein keratinization or desquamation is regulated in mammalian skin after the topical administering step.

22. The method of claim 4, wherein mammalian skin damage caused by sun or radiation exposure is repaired, and complications associated with such exposure are healed after the topical administering step.

23. The method of claim 4, wherein skin peeling and flaking is reduced in mammalian skin after the topical administering step.

* * * * *